United States Patent [19]

Gross

[11] 3,742,970

[45] July 3, 1973

[54] FLOW-SENSITIVE SENSING AND SHUT-OFF DEVICE

[75] Inventor: Robert I. Gross, Roslyn Heights, N.Y.

[73] Assignee: Pall Corporation, Glen Cove, N.Y.

[22] Filed: Feb. 13, 1970

[21] Appl. No.: 11,161

[52] U.S. Cl................ 137/100, 60/54.5 E, 116/70, 116/117, 116/125, 137/501, 137/503, 137/514.5, 137/554, 137/556, 137/557, 137/594, 303/84 A
[51] Int. Cl............................................ F16k 37/00
[58] Field of Search..................... 303/84 A; 116/70, 116/117, 125; 137/87, 98, 99, 100, 101, 112, 118, 556, 553, 554, 557, 514.5, 514.7, 594, 498, 503, 500, 501; 60/54.5 E

[56] References Cited
UNITED STATES PATENTS

| 1,291,609 | 1/1919 | Nichols | 137/514.7 |
| 1,993,790 | 3/1935 | Kinsella | 137/101 X |
| 2,710,620 | 6/1955 | Watson | 137/118 |
| 2,956,577 | 10/1960 | Kirkham | 137/118 X |
| 3,010,469 | 11/1961 | Leighton | 137/118 |
| 3,148,364 | 9/1964 | Engels et al. | 137/118 X |
| 3,164,164 | 1/1965 | Pall et al. | 137/467 |
| 3,441,318 | 4/1969 | Bueler | 137/101 X |
| 3,499,415 | 3/1970 | Gutkowski | 116/70 |
| 3,550,617 | 12/1970 | Johnson | 137/514.5 |
| 3,502,102 | 3/1970 | Maltby | 137/498 |

FOREIGN PATENTS OR APPLICATIONS

| 1,113,797 | 12/1955 | France | 303/84 A |
| 589,330 | 3/1959 | Italy | 137/98 |

Primary Examiner—Martin P. Schwadron
Assistant Examiner—David J. Zobkiw
Attorney—Janes & Chapman

[57] ABSTRACT

A flow-sensitive sensing and shut-off device is provided, having sensing means responsive to a predetermined flow differential between a first and a second fluid line, to close one or both of the lines, and/or to indicate such flow differential has been reached or exceeded.

14 Claims, 7 Drawing Figures

FLOW-SENSITIVE SENSING AND SHUT-OFF DEVICE

The need for an effective means to detect and stop leakage in fluid control systems is extremely important. Undetected leakage can be fatal in fluid control systems on aircraft, or in industrial plants. If the leaking fluid is inflammable, a fire hazard can result, and if it is toxic, serious injury or death can result.

Automatic shutoff valves for stopping the flow of fluid through a system in the event of a leak in a downstream line are, of course, known. However, the known devices have many disadvantages which render them unsatisfactory in sophisticated recirculating systems. Many automatic shutoff devices operate in response to a change in the upstream flow or pressure conditions, on the assumption that a leak in the downstream line will cause either an increase in flow or a reduction in pressure in the upstream line. However, in a complex fluid system, a small downstream leak may not decrease the upstream pressure nor increase the upstream flow sufficiently to actuate the valve.

U.S. Pat. No. 2,466,375 to Carbon discloses a normally closed automatic shut-off valve which is responsive to the pressure in the return line of a fluid recirculating system, and is held open only while line pressure is normal. If a leak in the system results in a reduction in the return line pressure to below the minimum needed to hold the shut-off valve open, it closes, and stops the flow in the system. However, if a leak does not reduce return line pressure enough, the valve does not close. Furthermore, a large increase in differential pressure across a component in the system, such as a filter, can decrease the return line pressure sufficiently so that valve could close. Consequently, the reliability of the Carbon valve is low.

It is often desirable that a device be provided to detect and indicate the existence of a leak or other flow variations in a fluid system so that any necessary repairs may be carried out as quickly as possible. Unfortunately, indicators that have been provided for this purpose suffer from the same deficiencies as do the shut-off valves discussed above. For example, Gruber, in U.S. Pat. No. 3,098,500, discloses a broken line indicator and shut-off. The device is sensitive merely to the upstream pressure acting upon a normally closed indicating piston, which opens and closes in response thereto. It is clear that if the upstream pressure is not severely reduced due to a leak in the downstream line, the piston will not be moved into its indicating position, and thus the existence of a relatively small leak will remain undetected. Furthermore, in complex fluid systems it may be necessary to maintain a certain flow ratio between two independent fluid lines. In such cases a device to detect variations in the flow between the two lines is quite advantageous, but since the available devices discussed above are sensitive and responsive primarily to pressure changes, rather than flow changes, their sensitivity and reliability are insufficient, and their use is often precluded.

In accordance with the present invention, a flow-sensitive device is provided having a flow-sensing means responsive to flow variations between two fluid lines to close one or more of the lines and/or otherwise signal when a predetermined flow differential has been reached or exceeded. The flow sensitive device of the instant invention comprises a first flow-sensing means in the first fluid line, and a second flow-sensing means in the second fluid line, linked to the first flow-sensing means and movable therewith between first and second positions, the flow in each fluid line creating opposing differential pressures across each flow-sensing means, balancing the flow-sensing means in the first position under normal steady state flow, and moving the flow-sensing means to the second position whenever any predetermined change in the steady state flow in one fluid line is reached or exceeded.

In the second position, a signal is given to indicate that the predetermined change in flow has been reached. This signal can be provided by a shut-off valve, which stops the flow in one or both lines, and/or by an indicating device which visually, audibly or otherwise indicates the condition.

In a recirculating fluid system, fluid flow in the pressure line and fluid flow in the return line are fixed and remain in a stable so-called steady-state equilibrium under normal flow conditions, unless something happens, such as a leak, or a flow blockage. Similar steady state conditions can prevail in any interrelated fluid lines in which flow in one is related to the flow in the other in a fixed ratio. When the flow in one related line changes, the flow in the other can be affected, the steady state equilibrium or flow ratio is upset, and a flow differential between the two lines develops. In the case of a recirculating system the flow differential represents the difference between the relatively higher flow in the pressure line and the relatively lower flow in the return line. In other interrelated flow lines the differential is the difference between the desired flow ratio and the actual flow ratio.

The flow-sensing means of the invention is not pressure-sensitive, in the sense that its response is dependent upon an increase or decrease in the line pressure. Neither an increase in the pressure of the fluid in the first line, nor a decrease in the pressure of the fluid in the second line, affects its operation. In addition, since the flow-sensing means is responsive only to flow differentials between the two lines, it will not sense an increase in flow rate in one line unless the flow rate in the second line is not correspondingly increased. This is particularly important in recirculating systems where a quite normal increase in the upstream flow rate in the pressure line can be expected to result in a corresponding increase in the return line flow rate, unless a leak develops. Thus, false actuation created by a normal flow increase in the pressure line is precluded.

The sensing means of the present invention therefore truly detects only abnormal flows that affect one part of the system but not another. Where a leak in the system does not create a substantial change in pressure, the flow-sensing means will still sense and respond to the condition because the flow has changed. It thus provides a high degree of sensitivity necessary for the detection, indication and stoppage of leaks and other abnormalities in many types of fluid systems.

The flow-sensing means of the invention comprises a flow-responsive member reciprocably movable between first and second positions, disposed across the line of flow in a fluid line, and having surfaces exposed to fluid pressure upstream and downstream of the member; and a flow-restricting passage sized to carry past the member the normal fluid flow in the line over its normal operating range, and under predetermined flow conditions create a fluid pressure differential across the responsive member between its upstream and downstream surfaces, to urge it towards one of its two positions. The flow-restricting passage can be formed directly in the responsive member, or in surrounding structure, so long as it is capable of carrying the fluid around or through the responsive member in at least one of the first and second positions.

The flow-responsive member must have sufficient upstream and downstream surface area so that the force created by the differential pressure acting thereupon will be great enough to balance it in one position, under normal flow conditions, and move it to another position, whenever a predetermined pressure differential develops across the member. Suitable flow-responsive members include pistons slidably disposed within the fluid lines, deflectable diaphragms fixed at their periphery within the fluid lines, compressible or expandible bellows, in which the periphery of one end is fixed within the fluid lines, and Belleville washers, as disclosed in U.S. Pat. No. 3,164,164 to Pall et al., deflectible about either their inner or outer peripheries, or both.

In determining which type of flow-responsive member is best suited for a particular fluid system, such parameters as the amount of desired travel and the magnitude of the differential pressure created thereacross by the flow through the flow-restricting passage must be considered. Where extreme sensitivity and sure response to small flow changes are important, sensing means having large pressure-exposed surface areas, such as diaphragms and bellows, are usually preferred. But, if high pressure differentials are expected, diaphragms and bellows may not possess the requisite strength. Where a large travel distance is desired, diaphragms and Belleville washers may be precluded from use, whereas they may be preferred if the distance between the first and second positions is relatively small. In most cases, however, pistons can be designed with the necessary sensitivity and strength, for any travel distance desired, and therefore are preferred.

The flow-restricting passages can be of the laminar flow type, in which the relationship between the flow and the differential pressure is linear, or of the turbulent flow type, in which the differential pressure is proportional to the square of the flow. Considerations such as variations in flow rate and temperature are important in determining which type of flow-restricting passage to utilize. If the temperature and flow rate throughout the system are relatively constant, and sensitivity to a small range of flow rates is sufficient, turbulent flow passages operate quite satisfactorily to provide the necessary differential pressure across the flow-responsive member. If, however, a response over a wide range of flow rates is expected, turbulent flow passages are not always satisfactory, due to the fact that if the flow is decreased sufficiently, the turbulent flow passage will tend to exhibit laminar flow characteristics. The exact point where this will occur is often difficult to predict, since there is a transition zone between turbulent and laminar flow, and in this zone, the operation of the flow-sensing means may be erratic. Similarly, since the viscosity of hydraulic fluid is inversely proportional to the temperature, at low temperatures a turbulent flow passage may become sensitive to the high viscosity fluid, and again exhibit laminar-flow characteristics. Laminar flow-restricting passages, on the other hand, operate predictably over wide ranges of flow and temperature, and are therefore preferred, where large variations in flow and temperature are likely.

The most common and preferred type of laminar flow-restricting passages are capillary passages. A capillary passage can be through the flow-responsive member, or a separate capillary tube can be attached thereto or therein. A capillary can also be disposed in the housing structure in parallel with the flow-responsive member. In addition, a narrow annular clearance between the flow-responsive member and the housing can also serve as a laminar flow-restricting passage. However, the tight tolerancing required to accurately dimension such a passageway and prevent it from changing dimensions as the flow responsive member moves renders it rather expensive, and less desirable than a capillary passage. It also reduces accuracy of response to flow changes.

Turbulent flow-restricting passages, such as orifices or venturis, can also be formed within or as part of the flow-responsive member, or within the housing structure.

The dimensions of the various flow-restricting passages are determined by applying well known fluid dynamics equations to the flow conditions of the particular system. The differential pressure created by the flow-restricting passage should be high enough to ensure adequate sensitivity, yet low enough so as not to inhibit normal flow.

It is usually necessary to protect the flow-restricting passages from contaminants entrained in the fluid of the system, to prevent plugging and the eventual blockage of flow. Ideally, the flow sensing device is placed immediately downstream of a filter. Small filter screens also can be provided at the entrance to the flow-restricting passages. The pore size of the screen should be smaller than the diameter of the flow passage, to ensure that particles that pass through the screen can flow through the passage.

The surface area of the flow-responsive member and the pressure differential created by the flow through the flow-restricting passage are determined by the fluid pressure differential at which actuation is desired. Enough surface area is needed to obtain the force required to move the flow-responsive member into or away from an actuating (or nonactuating) position. As previously discussed, at normal flow, the opposing forces on both flow-sensing means should balance the device in one position. But it should be noted that in order to accomplish this, the flow in the first and second lines need not be equal. The flow-sensing means can be designed to meet any normal steady state flow in the two lines, between which the predetermined flow differential is to be detected. Whether the flow-sensitive device be utilized to detect variations in flow between two independent or interconnected lines, having different normal flow rates, the diameter and length of the flow-restricting passages and the surface area of the flow-responsive members can be designed to provide the necessary balancing forces. The flow differential at or exceeding a predetermined value between the two lines, rather than a difference in absolute flow rate in the lines, crates the imbalance sufficient to actuate the flow-sensing means.

The same result can be achieved by providing flow-sensing means of equal size and utilizing a mechanical advantage type linkage between the two flow-sensing means, to compensate for any normal flow differences between lines.

It is usually desirable to utilize a bias means, such as a spring or a magnet, to retain the flow-sensing means in a normally nonactuated position, and to reset the flow-sensing means into the nonactuated position, after actuation. The bias means facilitates control of the flow-sensing means to ensure actuation does not occur before the predetermined flow differential is reached or exceeded, since the force exerted on the sensing means will be increased by the supplemental action of the spring.

Although it is not essential, in the interest of cost savings and reliability it is preferable that both flow sensing means be installed in a single housing. The housing has a separate inlet and outlet for each fluid line, and it may also have separate chambers in fluid communication with the inlet and outlet in each line. One flow-sensing means is disposed within each fluid line or within each chamber, across the line of flow from the inlet to the outlet. To simplify the linkage between the two flow sensing means, except where a mechanical advantage is desired, the chambers can be separated by a common wall. The two flow-sensing means can then be mounted on the same shaft, or connected by a tie rod, which extends through and is movable within a bore formed in the wall. A relatively tight clearance fit between the shaft or rod and the bore is important, to prevent cross leakage between the two fluid lines.

When it is desired to shut off the flow in one or both lines in response to a flow differential, as in a leaky recirculating system, the flow-sensing means in the line to be shut also comprises a shut-off valve that is movable therewith. The shut-off valve can be a piston dimensioned to seal within a corresponding bore leading to the outlet, or a poppet adapted to seal against a corresponding seat in the housing. Other types of shut-off valves, such as the sleeve type, disc type and diaphragm type, can be used, as will be readily apparent to those skilled in the art. The valve should be sized and positioned so that it in no way obstructs normal flow, yet effectively stops the flow through the line upon actuation.

An indicator to signal the actuation of the flow-sensing means can be provided, with or without a shut-off valve. The indicator can provide either direct visual indication, by means of a warning button mounted on the housing, or can be linked by means of an electrical circuit to a signal light or other alarm system, such as a buzzer or bell. The indicator can be of the mechanical type, wherein there is a direct mechanical linkage between the flow-sensing means and the signalling device, or of the magnetic type, as shown in U.S. Pat. No. 2,942,572, to David B. Pall.

A mechanical indicator can be simply a rod or stem which is attached to the flow-sensing means, and extends through a bore in the housing to the exterior. In the non-actuated or first position of the sensing means, the rod can project from the housing so that it is quite visible. When the sensing means moves in response to a differential in flow between the two fluid lines, the rod can be withdrawn into the housing by the sensing means, so that it is no longer visible. The reverse sequence can also be provided, in which the rod projects in the actuated position.

In most cases, since there is a relatively large differential in pressure between the interior and exterior of the housing, an O-ring seal is required between the rod and the bore in the housing to ensure against the possibility of external leakage. In addition, since the indicating rod extends to the exterior of the housing, it will be subjected to atmospheric pressure and thus create an imbalance between the first and second flow sensing means. In order to prevent this, balancing means must be provided using techniques well known to those skilled in this art. Therefore, magnetic indicators are preferred.

A typical magnetic indicator which can be simply adapted for use in the present invention, is disclosed in U.S. Pat. No. 2,942,572 to David B. Pall. A first magnet can be attached to the first flow-sensing means, so that it is movable therewith between the first and second positions. A second magnet, mounted on the exterior of the housing, is movable toward and away from the first magnet, and is normally retained toward the first magnet by magnetic attraction, when the first magnet is in the first position. Bias means, such as a spring, urges the second magnet away from the first magnet, and into an indicating position, overcoming the force of magnetic attraction when the first magnet is more than a predetermined distance away from the second magnet, upon the movement of the flow-sensing means in response to a flow differential. The second magnet can include or be connected to a button which provides visual indication of the actuation, or can actuate a switch which provides an electrical indication.

Other magnetic indicators can also be utilized. These include indicators of the type utilizing a single magnet, concentric magnets and opposing magnets.

The flow rate in many hydraulic systems is variable, and fluctuates upon the actuation of the components thereof. All systems do, however, have a normal flow rate range which is maintained throughout normal operation. The flow-sensing means, and in particular the flow-restricting passages, are sized such that they carry the normal flow rate without adversely increasing the differential pressure in the system. As the flow rate increases, however, the pressure differential across the flow-sensing means also increases.

If the system must accommodate high transient flow rates without actuation of the device, each flow-sensing means can be provided with a by-pass relief valve for such high transient flows. When the differential pressure across the flow-sensing means exceeds a predetermined value, due to the increased high transient flow in the line and through the flow restricting passage, the relief valve opens to pass the increased flow. Any further increase in flow is carried by the relief valve, rather than the flow restricting passage, so that the increase in differential pressure is kept below an acceptable limit. The operation of the flow-sensing means is not substantially affected by the opening of the relief valve, since a flow differential between the fluid lines will still create a lower differential pressure across one flow sensing means, and thus result in the actuation of the device.

The relief valves are disposed in parallel with the flow-restricting passages, and can be any one of various types, such as a spring loaded poppet, piston or sleeve. Preferably, however, a Belleville washer relief valve, such as those disclosed in U.S. Pat. Nos. 3,164,164 to Pall et al. and 3,262,567 to Pall et al., is employed. The characteristics of the Belleville washer relief valve make it quite desirable for use in conjunction with the flow sensing means. Unlike conventional spring loaded valves, the differential pressure across the Belleville washer relief valve does not necessarily increase in relation to the increase in flow rate. This is because the spring rate of a Belleville washer is not linear, and in some instances the washer requires less force to hold it in a fully deflected position that it does to initially deflect it. This is an extremely desirable characteristic for a valve whose primary purpose is to carry an increased flow with a minimum differential pressure. Another important advantage of the Belleville washer relief valve is the fact that it is quite simple in construction and takes up very little space within the housing.

Many systems, such as recirculating hydraulic control systems, often have momentary pressure and flow surges in the pressure line, which are usually of very short duration. The increased flow created by surges or sudden high transient flows through the flow restricting passage of the pressure line creates a differential pressure across the flow sensing means which is not immediately balanced by a like increase of flow in the return line. The effect is that a flow surge of this type can cause premature response of the device due to the delay in the surge flow reaching the return line flow sensing means.

To prevent false actuation, in the case of surges or higher flows of short duration, a snubber can be utilized to dampen the effect of the surge and delay the response of the flow sensing means sufficiently long so that its effect upon them is dissipated.

The snubber can comprise a stem or piston which extends from the flow-sensing means and slidably engages and seals within a closed bore in the housing; and a flow-restricting passage such as a capillary tube in fluid communication with the closed bore through which the fluid displaced by the piston upon actuation of the flow sensing means must pass. The capillary tube is sized to prevent the rapid displacement of the fluid and thus dampen the effect of the surge.

Although a capillary tube is usually the most effective flow-restricting snubber, and is therefore preferred, other flow-restricting passages, such as an orifice or series of orifices, can also be utilized.

The invention is further described with reference to the drawings in which.

Figure 1:
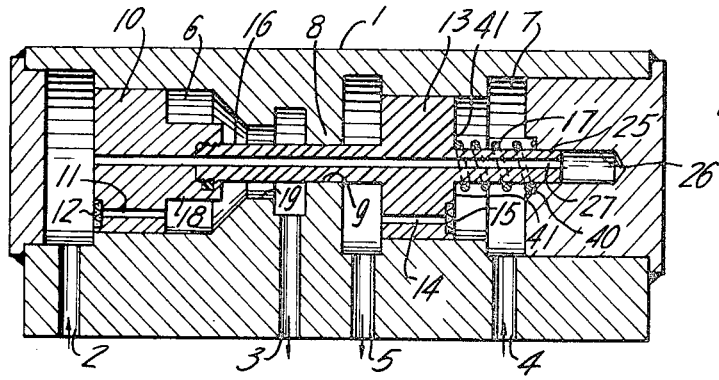
FIG. 1 shows schematically the cross-sectional structure of one embodiment of flow-sensitive sensing device of the invention, having piston-type flow-sensing means, and interconnected shut-off valve, with the valve in the open position.
Figure 2:
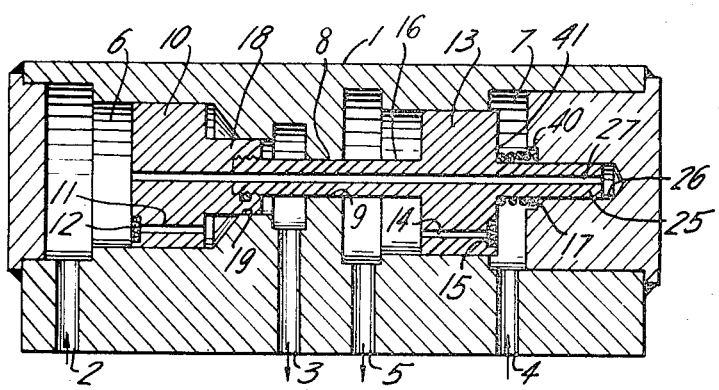
FIG. 2 shows schematically the embodiment of FIG. 1 with the valve in the closed position.

The flow-sensitive device shown in FIGS. 1 and 2 comprises a valve housing 1 having a first line inlet 2 and outlet 3 and a first line chamber 6 in fluid communication with the first line inlet and outlet, a second line inlet 4 and outlet 5, and a second line chamber 7, coaxial with the first line chamber 6, and in fluid communication with the second line inlet and outlet. Reentrant portion 8 separates the first line chamber 6 from the second line chamber 7, and defines a bore 9 extending therethrough. A first flow-sensing means in the form of a flow-responsive piston 10 and a flow-restricting passage 11 is reciprocably movable in chamber 6, in the line of flow from the inlet 2 to the outlet 3. The flow-restricting passage 11 is a capillary through which fluid from the inlet 2 must pass to reach the outlet 3. A protective filter screen 12 is disposed at the entrance to the flow-restricting passage 11, to prevent its blockage by contaminants. The piston 10 has a shut-off valve portion 18, which is adapted to seal at its periphery within a corresponding bore 19, formed at the outlet end of the first line chamber 6, thus closing off the first line whenever the portion 18 is within the bore 19. The portion 18 can proceed no further than reentrant portion 8, which serves as a stop, but in the closed position it need not contact portion 8 to seal the line.

A second flow-sensing means comprising flow-responsive piston 13, equal in diameter to piston 10, and a flow-restricting passage 14, is reciprocably movable in the second line chamber 7 in the line of flow from the inlet 4 to the outlet 5. The flow-restricting passage 14, through which flow must pass to reach the outlet 5, is a capillary, sized to produce the same pressure drop as the capillary 11 in the piston 10. A protective filter screen 15 prevents contaminants from being lodged in the flow-restricting passage 14. The two flow-sensitive pistons 10 and 13 are attached to rod 16, which slidably extends through the bore 9 defined by portion 8, in a leak-tight sliding fit.

The pistons 10 and 13 are biased in the normally open position shown in FIG. 1 by a coil compression spring 17, one end of which seats in the annulus 40 in the second line chamber 7 and the other end of which bears against the face portion 41 of piston 13.

An extension 25 of piston 13 protrudes into a blind bore 26 in housing 1. A passage 27 extends through the pistons connecting the bore to the upstream side of piston 10. The extension is the same diameter as rod 16.

In operation, the flow through the capillary 11 of the first piston 10 creates a laminar flow differential pressure across the piston 10, which tends to move it and valve 18 to the closed position. Similarly, the flow through the capillary 14 in the second line creates an opposing differential pressure across piston 13, which tends to hold the piston 13 and valve 18 in the open position. As long as the flows in the two lines are normal, the forces exerted upon the pistons tend to balance the pistons 11 and 13 with the valve 18 in the open position. The extension 25, bore 26 and passage 27 balance the effect of the difference between the pressures in chambers 6 and 7 on rod 16 and cancel it out. Should an abnormal flow condition occur in the system, however, wherein the first line flow increases, or the second line flow decreases, the pressure drop created across the piston 13 by the flow through passage 14 will be less than the pressure drop created across the piston 10, by the higher flow through passage 11, thus permitting the flow-sensing device to overcome the force of the spring 17, and move to the valve-closed position, to stop the flow in the first fluid line, as shown in FIG. 2. If the first and second lines, respectively, represent the pressure and return lines of a recirculating system, a differential in flow between the two lines created by a leak or blockage in the system will unbalance the pistons 10 and 11, and close the valve 18.

When the valve is shut, the piston 18 seals within the bore 19 and the line pressure in chamber 6 exerts a force against the piston 10 to maintain it in the closed position. In order to reset the valve, the pressure must be reduced to zero so that the spring 17 will return the valve to its normally open position.

Figure 3:
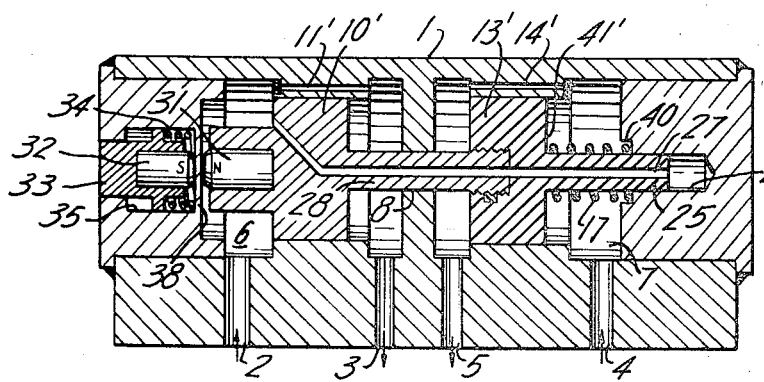
FIG. 3 shows schematically the cross-sectional structure of another embodiment of the flow sensing device having a magnetic indicator.
Figure 4:
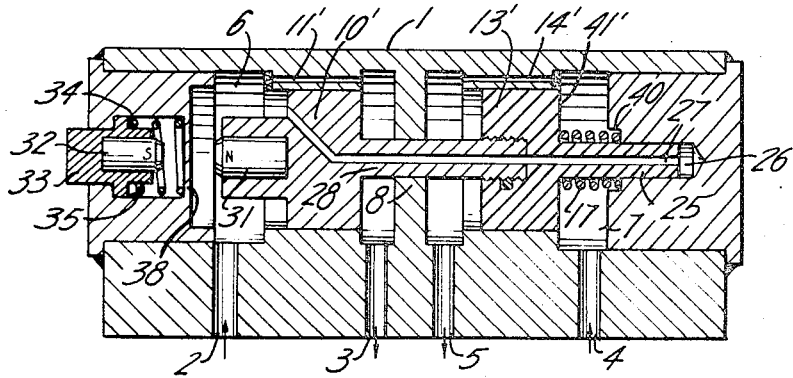
FIG. 4 shows the embodiment of FIG. 3 with the sensing device and flow indicator in the actuated position.

A flow responsive indicator for detecting and signalling a predetermined differential in flow between two fluid lines is provided in the embodiment of the invention shown in FIGS. 3 and 4. As in the previously described embodiment, a flow-responsive piston 10' is disposed within a first line chamber 6 of the housing 1, in the line of flow from the inlet 2 to the outlet 3. A second piston 13' which is linked to and movable with the piston 10 via shaft 28 is slidably disposed within a second line chamber 7 in the line of flow from the line inlet 4 to the line outlet 5.

In this embodiment the flow-restricting passage 11' is a capillary disposed within the body of the housing 1 and extending along the chamber 6 from the inlet side of the piston 10' to the outlet side so that all the flow passing from the inlet 2 to the outlet 3 must pass through the flow-restricting passage 11'. Similarly, a flow-restricting passage 14' in the second line is disposed within the wall of the housing 1, and carries all the flow from the inlet 4 to the outlet 5. The flow-restricting passages in the two lines are dimensioned so that equal flow creates equal differential pressure across both pistons.

The flow indicator is of the magnetic type, comprising a first magnet 31 of magnetic material such as Alnico attached to the flow-responsive piston 10', and biased with piston 10' against the end wall of chamber 6 by spring 17. A second magnet 32 of magnetic material such as Alnico attached to an indicating button 33, is disposed within a bore 35 extending from the exterior of the housing, and is magnetically attracted to and held in place against housing wall 38 by the first magnet 31. A spring 34 disposed within the bore 35 biases the button 33 and the magnet 32 toward an indicating position. However, the magnetic attraction between the two magnets when the device is in its unactuated position is sufficient to overcome the biasing force of the spring 34, and thus maintains the magnet 32 and button 33 in the position shown in FIG. 3.

When the flow in the second fluid line through flow restricting passage 14' is less than the flow in the first fluid line through flow restricting passage 11', the differential pressure acting upon piston 13' is likewise less than the differential pressure acting upon piston 10', and the flow sensing device will thus move against the force of the spring 17 into an actuated position. As the magnet 31 moves further away from the magnet 32, the magnetic attraction decreases, thus enabling the spring to overcome the magnetic attraction and move the indicating button 33 to its actuated position, to visually signal the predetermined change in flow has been reached or exceeded. The actuated position of the indicator is shown in FIG. 4.

When the hydraulic system is shut down, or the flow in the two lines is once again equalized, the forces upon the pistons 10' and 13' will become equal, and the spring 17 will return the pistons to their normal positions. The distance between the magnets 31 and 32, however, will remain sufficiently great so that the attractive force between the two magnets will not overcome the force of spring 34. In this manner, the indicating button 33 will remain in its actuated position until manually reset, to continue to signal a malfunction even after the system has been shut down.

Figure 5:
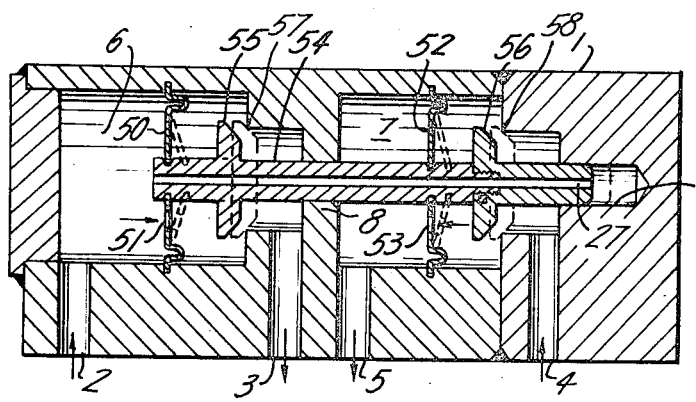
FIG. 5 shows schematically the cross-sectional structure of another embodiment of the flow-sensitive device, having diaphragm-type flowing-sensing means and two shutoff valves.

In the embodiment of the invention shown in FIG. 5, the flow-sensing means in the first fluid line comprises a resilient diaphragm 50 of rubber fixed within chamber 6 across the line of flow from the inlet 2 to the outlet 3, and a flow-restricting orifice 51 through which the flow from the first fluid line must pass. Similarly, the second flow sensing means in the second fluid line chamber 7 comprises a resilient diaphragm 52 and a flow restricting orifice 53, which passes the flow from the inlet 4 to the outlet 5. The two diaphragms are linked together by a tie rod 54. Poppet valves 55 and 56 attached to diaphragms 50 and 52, respectively, close both fluid lines upon actuation by seating against valve seats 57, 58.

Normally, the first line flow through orifice 51 creates a differential pressure across diaphragm 50, which is counterbalanced by an equal differential pressure across diaphragm 52, created by the second line flow through orifice 53. If a flow differential develops, wherein the flow in the second fluid line 4, 5 is less than the flow in the first fluid line 2, 3, the diaphragms are deflected into the position shown by the dotted lines by the higher differential pressure acting upon diaphragm 50, and the poppet valves 55 and 56 seat at 57, 58 and shut off flow in both lines, whereupon system pressure in chamber 6 holds the valves closed. The resiliency of the diaphragms will return them to their normal position when system pressure is reduced to zero.

Figure 6:
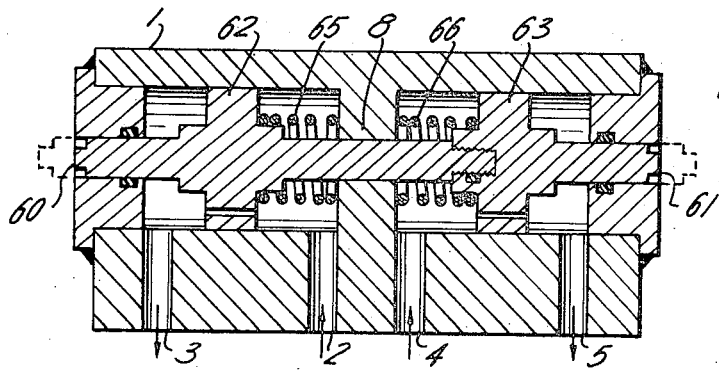
FIG. 6 shows schematically a cross-sectional view of a further embodiment of the invention, having mechanical flow-indicating means.

The mechanical flow indicator shown in fIG. 6 is responsive to an increase or decrease in flow in either fluid line, and provides a separate signal for each condition. When the flow in the first fluid line from inlet 2 to outlet 3 is equal to the flow in the second fluid line from inlet 4 to outlet 5, the differential pressures across pistons 62 and 63 are equal and opposite, so that springs 65 and 66 position them in the neutral or normal position shown. When the flow in the first fluid line across piston 62 is greater than the flow in the second fluid line across piston 63, the pistons move to the left so that the first indicating or signaling stem 60 is visible. Similarly, when the flow in the second fluid line exceeds the flow in the first fluid line, the pistons in response move to the right and the second indicating stem 61 becomes visible.

Figure 7:
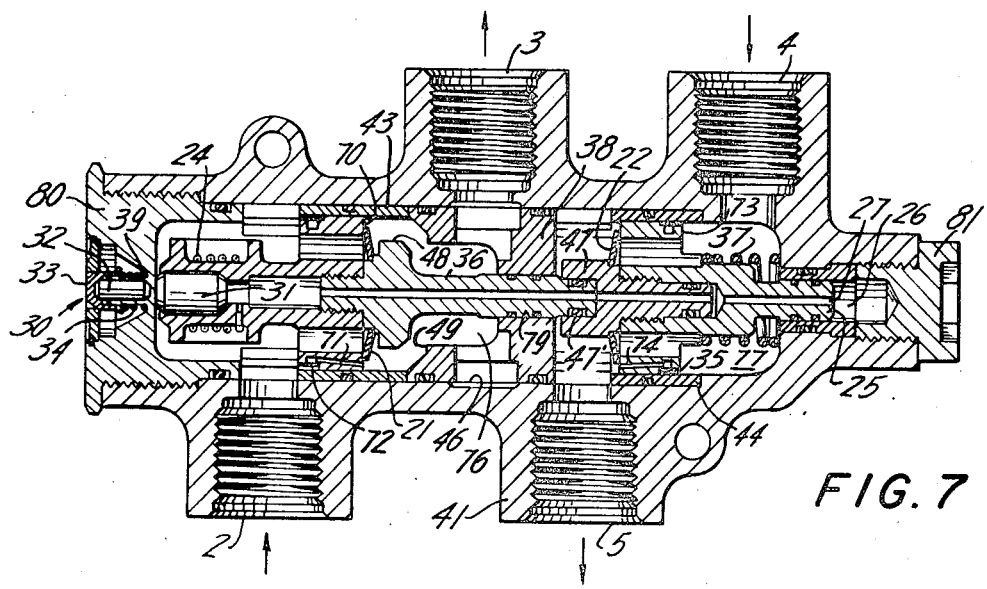
FIG. 7 is a cross-sectional view of a preferred embodiment of the flow-sensitive sensing device, in the form of a hydraulic circuit breaker for a recirculating system, having both a shut-off valve and a magnetic indicator.

A preferred embodiment of the flow-sensitive sensing device is in the form of a hydraulic circuit breaker, shown in FIG. 7.

A valve housing 41 is provided having a central through bore 46 into which open pressure line inlet 2 and outlet 3, and return line inlet 4 and outlet 5. The open ends of the bore 46 are closed by caps 80, 81, threaded into the ends. Fitted in a recessed portion at the periphery of the central bore are, in order, sleeve 44, divider 38, and sleeve 43. The divider 38 defines a pressure line chamber 76 and a return line chamber 77 the inlet 2 and outlet 3 enter chamber 76, and the inlet 4 and outlet 5 enter chamber 77. Sleeve 43 defines the cylinder in which piston 70 reciprocates, and sleeve 44 defines the cylinder in which piston 73 reciprocates. Piston 70 is in the line of flow from the inlet 2 to the outlet 3, and is formed with a flow-restricting passage 71 in the form of a capillary. A protective screen 72 blocks the entry of contaminants into the capillary, and thus prevents its plugging. Threaded into one end of the pressure line piston 70 is a valve in the form of a valve 48 which is adapted to seat against a corresponding valve seat 49 formed in the divider 38 on the upstream side of the pressure line outlet 3. The threads are sealed against leakage by an epoxy resin, but elastomeric seals could be used instead. The piston 70 and the sleeve 43 within which it operates are formed with very close clearances, so that fluid leakage between them will be insignificant.

A second flow responsive piston 73 guided by sleeve 44 is slidably disposed within the return line chamber 77 across the line of flow from the inlet 4 to the outlet 5, so that the return flow must pass through flow restricting passage 74 formed in the piston 73 in order to reach the return line outlet 5. The flow restricting passage 74 is also a capillary and is protected by screen 35. As on the pressure side, the return line piston 73 and its sleeve 44 are formed with extremely close clearances to prevent by-pass leakage.

The two pistons 70 and 73 are connected by shaft 36 formed as part of valve 48, which slidably extends through a bore 79 formed in the divider 38 and seals into cooperating shaft piece 47 with O-ring 48. The rod is lapped within the bore to inhibit leakage from the pressure side to the return side of the housing. The two pistons are biased in the open positions by a spring 37 disposed between the end of the return line chamber 77 and the flow sensitive piston 73.

Belleville washer relief valves 21 and 22 are provided on the pressure and return line pistons 70, 73, valve 21 being retained by valve member 48, and valve 22 by shaft piece 47. If the flow in each line exceeds a predetermined normal rate, the capillaries will create a pressure differential sufficient to deflect the Belleville washer relief valves, thus accommodating the increased flow. The Belleville washers have identical flow-pressure drop characteristics, and a positive rate, and will both open without actuation of the flow-sensing device, since the increased flow occurs in both lines, and does not constitute a flow difference between the lines.

A snubber is provided to prevent actuation upon the occurrence of a momentary pressure or flow surge in the pressure line. A piston 25 extending from the return line piston 73 slidably engages a blind bore 26 at the return line end of the housing. The stem 25 seals within the blind bore so that in order for the valve to actuate, the fluid trapped by the stem within the blind bore must be displaced. This is accomplished by a central flow passage 27 which extends from the blind bore via the shaft piece 47, and shaft 36 to the inlet side of the pressure line piston 70. At its terminal point on the pressure line side, a capillary tube 24 is provided through which the fluid displaced from the blind bore must pass in order for the piston 25 to slide into the closed bore 26. The capillary tube 24 prevents rapid displacement of the fluid and thus dampens the effect of a flow or pressure surge. The piston 25, the bore 26 and the passage 27 also balance the effect of the pressure difference between the pressure and return lines.

A magnetic indicator 30 is provided in cap 80 to signal when the valve 78 closes in response to a differential in flow between the pressure and return lines. As in the embodiment shown in FIGS. 3 and 4, the magnetic indicator comprises a first magnet 31 attached to and movable with the piston 70 from a nonactuating to actuating position and a second magnet 32 which reciprocates in bore 39 in cap 80, and is held in a nonactuating position by the attractive force of magnet 31. An indicating button 33 is attached to the magnet 32 and is moved into view upon actuation. A spring 34 biases the button 33 into the actuating position, but prior to actuation the magnetic attraction between the magnets 31 and 32 overcomes the force of the spring, to maintain the button 33 in a retracted position.

Static seals are provided by O-rings as shown.

In operation, fluid enters through the pressure inlet 2, passes through the flow-restricting passage 71 in the piston 70 to and through the pressure outlet 3. After the fluid passes through the hydraulic system, it is returned to its reservoir via the return line portion of the hydraulic circuit breaker, wherein the flow passes through the flow-restricting passage 74 in the return line piston 73.

The flow through the flow-restricting passage 71 on the pressure side creates a laminar flow differential pressure across the piston 70 which tends to move it into its actuated or closed position. Similarly, the return line flow through the flow-restricting passage 74 creates an opposing differential pressure which tends to hold the valve 48 in the open position. When the flow rate exceeds a certain predetermined amount, the Belleville washer relief valves 21 and 22 on both the pressure and return line pistons will open to accommodate the increased flow, but this does not actuate the flow-sensing device so long as the increased flow occurs in both lines.

As long as the pressure line flow and the return line flow are substantially equal, even though there are transient high flows, the forces exerted upon the pistons 70 and 73 tend to balance the valve in the open position. However, if the return line flow is reduced, due to a leak in the system, the pressure drop created across the return line piston 73 will be less than the pressure drop created across the pressure line piston 70, thus permitting the valve to overcome the force of the spring 77, and move to its closed position to stop the flow in the pressure line. In this position, the magnetic attraction between magnets 31 and 32 is reduced sufficiently so that the spring 34 moves the button 33 into its actuated position, to signal that the valve is closed, and that there is a leak in the system. In the closed position, the poppet 48 seals against the seat 49 formed in the divider 48 and the line pressure in chamber 76 exerts a force against the poppet 48 to maintain it in a closed position. In order to reset the valve, the pressure must be reduced enough so that the spring 77 will return the pistons to their normally open positions. The indicator can then be manually reset.

Having regard to the foregoing disclosure the following is claimed as the inventive and patentable embodiments thereof.

1. A flow-sensitive sensing device responsive to flow differences between two fluid lines to detect abnormal flow in one line without fluid intercommunication between the two lines by way of the sensing device and without controlling flow to compensate for such flow differences comprising a housing; entirely separate first and second fluid lines in fluid flow connection to and from the housing; first and second chambers in the housing; first channels in the housing connected with the first chamber and constituting a first fluid flow path for the first fluid line through the housing; second channels in the housing connected with the second chamber and constituting a second fluid flow path entirely separate from the first fluid flow path for the second fluid line through the housing; there being no fluid flow connection between the first and second fluid flow paths in the housing; a first flow-responsive member in the first chamber having surfaces exposed to upstream and downstream fluid pressure in the first fluid flow path, reciprocably movable between first and second positions, and disposed across the line of flow in the first fluid flow path; and a second flow-responsive member in the second chamber having surfaces exposed to upstream and downstream fluid pressure in the second fluid flow path and disposed across the line of flow in the second fluid flow path, linked to the first flow-responsive member and reciprocably movable therewith between first and second positions; each flow-responsive member having a laminar flow-restricting passage disposed thereacross carrying all normal fluid flow in the fluid flow path across which the flow-responsive member is disposed, each flow-restricting passage producing a normal pressure differential across said flow-responsive member between the upstream and downstream surfaces, to urge it towards one of its two positions, the flow in each fluid line creating opposing differential pressures across the first and second flow-responsive members in the first position under normal flow, and moving the two flow-responsive members to the second position whenever under abnormal flow in one fluid line a predetermined flow differential between the two lines is reached or exceeded, such movement being without compensation for such abnormal flow.

2. A flow-sensitive sensing device in accordance with claim 1, in which the flow-responsive members are pistons.

3. A flow-sensitive sensing device in accordance with claim 1, in which the flow-responsive members are diaphragms.

4. A flow-sensitive sensing device in accordance with claim 1, in which the flow-restricting passages are capillaries.

5. A flow-sensitive device in accordance with claim 1, in which a shut-off valve is operatively connected to at least one flow-responsive member and movable therewith to close at least one fluid line in one position of the flow-responsive member.

6. A flow-sensitive sensing device in accordance with claim 5, in which a signalling indicator is operatively connected to at least one flow-responsive member to provide a signal in one position of the flow-responsive member.

7. A flow-sensitive sensing device in accordance with claim 1, in which a signalling indicator is operatively connected to at least one flow-responsive member to provide a signal in one position of the flow-responsive member.

8. A flow-sensitive sensing device in accordance with claim 7, in which the indicator comprises a first magnetic means attached to one of the flow-responsive members and movable therewith between the first and second positions; bias means urging said flow-responsive members and the first magnetic means toward the first position; second magnetic means movable toward and away from the first magnetic means, and normally retained toward the first magnetic means by magnetic attraction when the first magnetic means is in the first position; and bias means urging the second magnetic means away from the first magnetic means into an indicating position to overcome the force of magnetic attraction when the first magnetic means and said flow-responsive members are moved to the second position.

9. A flow-sensitive sensing device in accordance with claim 1, in which each flow-responsive member is provided with a by-pass flow relief valve in parallel to each flow-restricting passage to carry excess flow through each fluid line whenever the differential pressure created by excess flow through the flow-restricting passages exceeds a predetermined amount.

10. A flow-sensitive sensing device in accordance with claim 9, in which the relief valves are Belleville washers.

11. A flow-sensitive sensing device in accordance with claim 1, in which a flow-responsive member is provided with a snubber to dampen the effect of a pressure or flow surge in its fluid line and thus prevent false actuation.

12. A flow-sensitive sensing device in accordance with claim 11, in which the snubber comprises a displacement piston which is connected to one flow-responsive member and which slidably engages and seals within a blind bore; and a flow-restricting passage in fluid communication with the blind bore through which the fluid trapped within the blind bore must pass in order to be displaced by the piston upon movement of the flow-responsive member toward one of its positions, the flow-restricting passage in fluid communication with the blind bore being sized to slow displacement of the fluid enough to allow the surge to pass through each line before the flow-responsive members can actuate.

13. A flow-sensitive sensing device in accordance with claim 1, in which the flow-restricting passages extend through the flow-responsive members.

14. A flow-sensitive sensing device in accordance with claim 1, in which the flow-restricting passages are disposed within the body of the housing alongside and in parallel to each flow-responsive member.

* * * * *